United States Patent

Guthrie, Sr.

[15] 3,690,246
[45] Sept. 12, 1972

[54] APPARATUS FOR FRYING CHICKEN

[72] Inventor: Clifton W. Guthrie, Sr., Richmond, Va.

[73] Assignee: Golden Skillet Corporation, Richmond, Va.

[22] Filed: Oct. 14, 1970

[21] Appl. No.: 80,563

Related U.S. Application Data

[60] Continuation-in-part of Ser. No. 870,835, Aug. 26, 1969, abandoned, which is a division of Ser. No. 656,500, July 27, 1967, Pat. No. 3,501,316.

[52] U.S. Cl. ......................99/336, 99/337, 99/407, 99/410
[51] Int. Cl. ............................................A47j 37/12
[58] Field of Search..................126/380, 369.1, 389; 137/533.11; 99/334, 335, 336, 403, 407, 411, 410, 337

[56] References Cited

UNITED STATES PATENTS

| | | |
|---|---|---|
| 3,187,664 | 6/1965 | Jennings..................99/407 X |
| 3,364,845 | 1/1968 | Wilson et al................99/336 |
| 2,532,639 | 12/1950 | Payne...............137/533.11 X |
| 3,431,834 | 3/1969 | Keathley et al..............99/336 |
| 2,546,464 | 3/1951 | Martin.........................99/336 |
| 3,466,997 | 9/1969 | Hartzog..................99/407 X |
| 2,907,659 | 10/1959 | Anetsberger et al..99/411 UX |

*Primary Examiner*—Billy J. Wilhite
*Attorney*—Low & Matthews

[57] ABSTRACT

An apparatus for frying chicken so as to produce the equivalent of a covered pan fried product. Chicken parts are marinated and breaded prior to cooking in a preheated apparatus. Following immersion in a cooking oil, the chicken parts are stirred, sealed and then cooked automatically according to a preselected cooking cycle. Pressure relief means insures that the pressure within a sealed cooking container is maintained either at atmospheric pressure or within one pound per square inch of atmospheric pressure. Motor driven screw means automatically lifts the chicken parts from the cooking apparatus at the conclusion of the cooking cycle.

8 Claims, 10 Drawing Figures

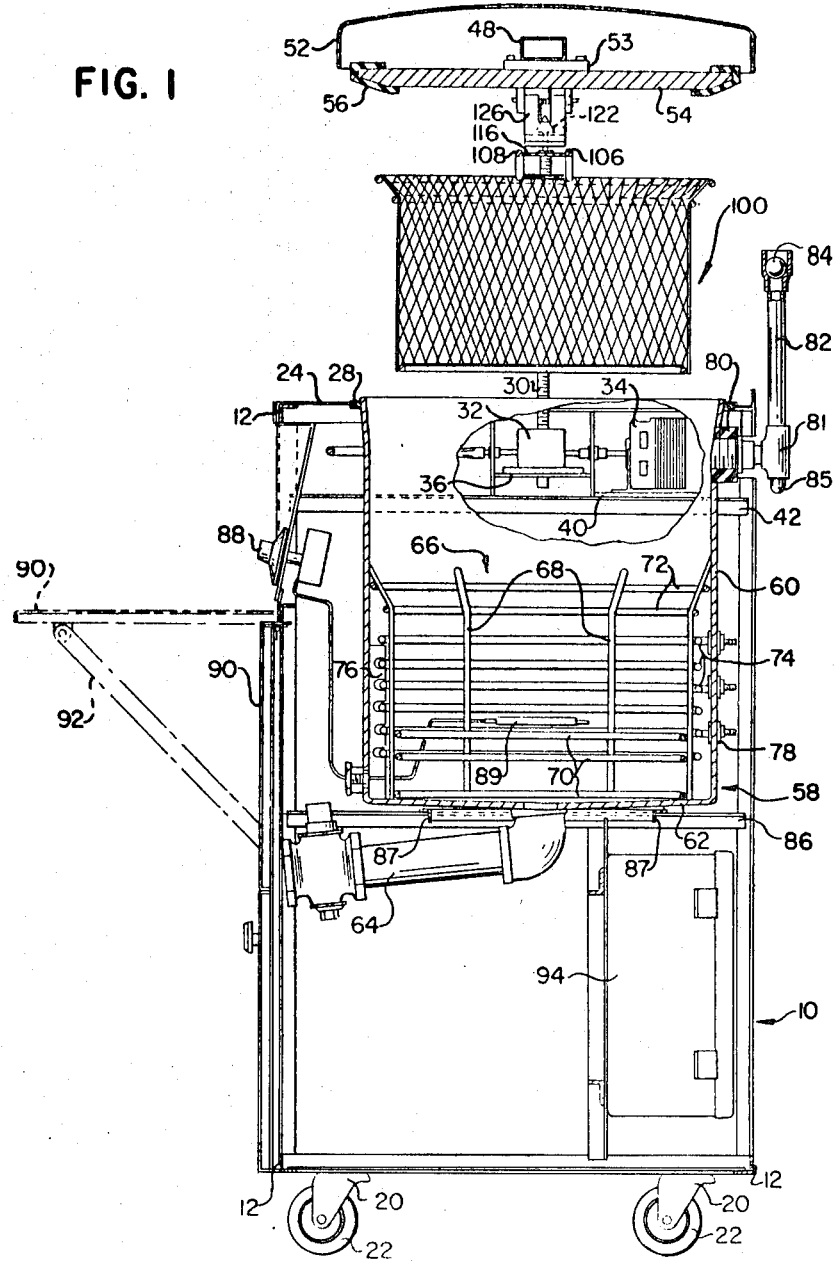

INVENTOR
CLIFTON W. GUTHRIE, SR.

BY *Rowe & Matthews*

ATTORNEYS

INVENTOR
CLIFTON W. GUTHRIE, SR.

BY *Rose & Matthews*

ATTORNEYS

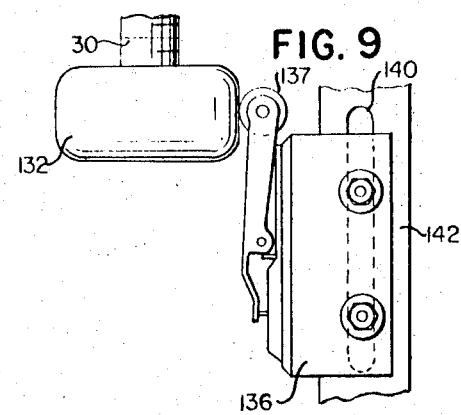
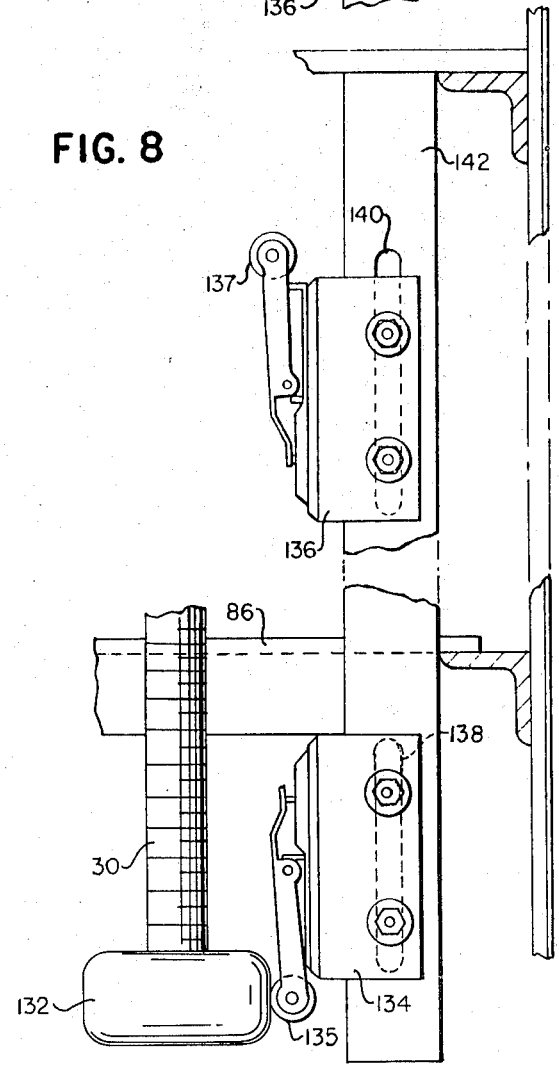
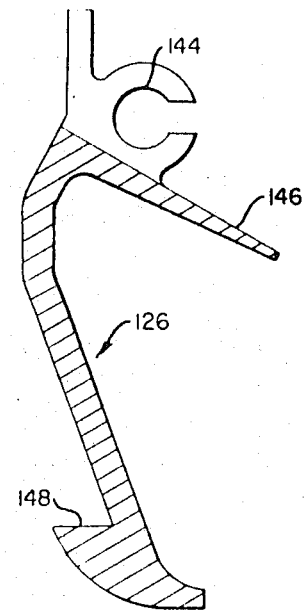
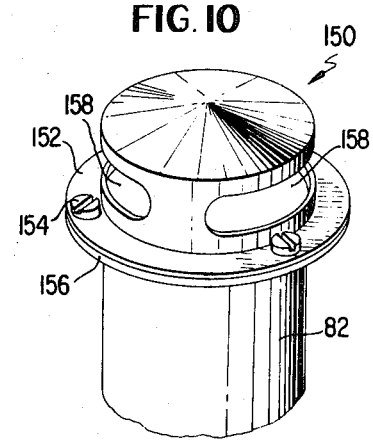
INVENTOR
CLIFTON W. GUTHRIE, SR.

APPARATUS FOR FRYING CHICKEN

This application is a continuation-in-part of Ser. No. 870,835, filed Aug. 26, 1969, now abandoned which, in turn, is a division of Ser. No. 656,500, filed July 27, 1967, now U.S. Pat. No. 3,501,316.

This invention relates to apparatus for frying chicken suitable for use in commercial installations such as may be practiced in franchised installations.

Heretofore it has been customary in commercial installations to fry chicken under pressure and thereby obtain a more rapid drying of the chicken so as to be able to meet customer demands for relatively rapid service. Certain undesirable risks are inherent in such a pressure fryer in addition to the prospect of producing some undesirable products. For example, there is a danger of explosion when the chicken is fried under pressure at cooking temperatures varying from 250° to 400° F. Also it has been known that under pressure the product puffs up and bursts. This is especially noticeable in chicken legs which then shrivel up and pull away from the bone.

Accordingly, it is an important feature of the present invention to eliminate all danger of explosion by virtually eliminating all pressure in the frying or cooking operation while still retaining moisture in the product. It has been found that chicken parts fried in accordance with the present invention hold up longer, retain their shape considerably better than heretofore, and are pleasing in appearance and taste.

The novel apparatus of the present invention receives the marinated and breaded chicken as described in the aforementioned U.S. Pat. No. 3,501,316 and cooks it automatically according to a preselected cooking cycle.

Specifically, the product is loaded into a wire basket conveniently located initially on a stand of the apparatus. The wire basket is then manually dropped into a container such as a kettle within the apparatus so as to immerse the chicken parts in preheated cooking oil therein. The chicken parts are stirred so as to break them apart and thereby avoid white spots on the finished product caused by uncooked breading in the stuck together areas.

A top cover for the container or kettle is then automatically lowered by motor driven screw means so that a peripherally retained gasket on the top cover seals the container. Simultaneously, spring loaded latching means on the underside of the top cover lockingly engages locking means affixed to the top of the wire basket to permit automatic withdrawal of the chicken parts within the basket at the end of a preselected cooking cycle. Pressure relief means are employed in conjunction with the kettle so as to insure that the product is virtually the equivalent of a covered pan fried product.

In one form of the invention, the pressure relief means consists of a ball check valve which maintains the water vapor to a substantial extent and vents the pressure whenever it tends to build up. This closely approximates the action of a dancing iron-lead lid on a skillet. In another form of the invention, the kettle is continuously vented to atmospheric pressure. In both forms of the invention, the motor driven screw means automatically lifts the chicken parts from their immersion within the cooking oil to a position where the wire basket may be removed by an attendant from the cooking apparatus immediately upon completion of the cooking cycle.

By having the chicken parts lifted automatically in a basket, the chicken drains better in that the oil is hot, and therefore thinner, whereby there is no substantial penetration of oil into the chicken. In other installations where a buzzer sounds at the completion of the cooking cycle the danger exists that an attendant will be busy with other matters. Thus the oil may cool or the chicken parts may be overcooked both of which result in the adsorption of more oil into the chicken.

The important features and advantages of the present invention will become readily apparent upon reference to the detailed specification and drawings wherein:

FIG. 1 is a side elevational view partially in cross section and with parts broken away;

FIG. 7 is an enlarged cross sectional view of a latching member suitable for use with the present invention;

FIG. 8 is a fragmentary view drawn to an enlarged scale of the limit switch means shown in FIG. 2;

FIG. 9 is a fragmentary view of a portion of FIG. 8 showing a different position of the switch actuator; and, FIG. 10 is a fragmentary perspective view of another form of the invention drawn to an enlarged scale.

Figure 3:
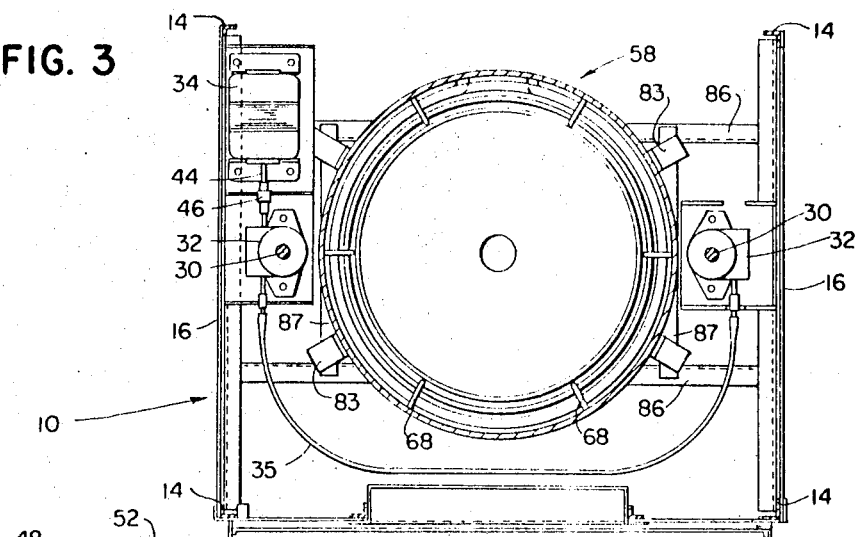
FIG. 3 is a top plan view of the apparatus shown in FIG. 1.
Figure 2:
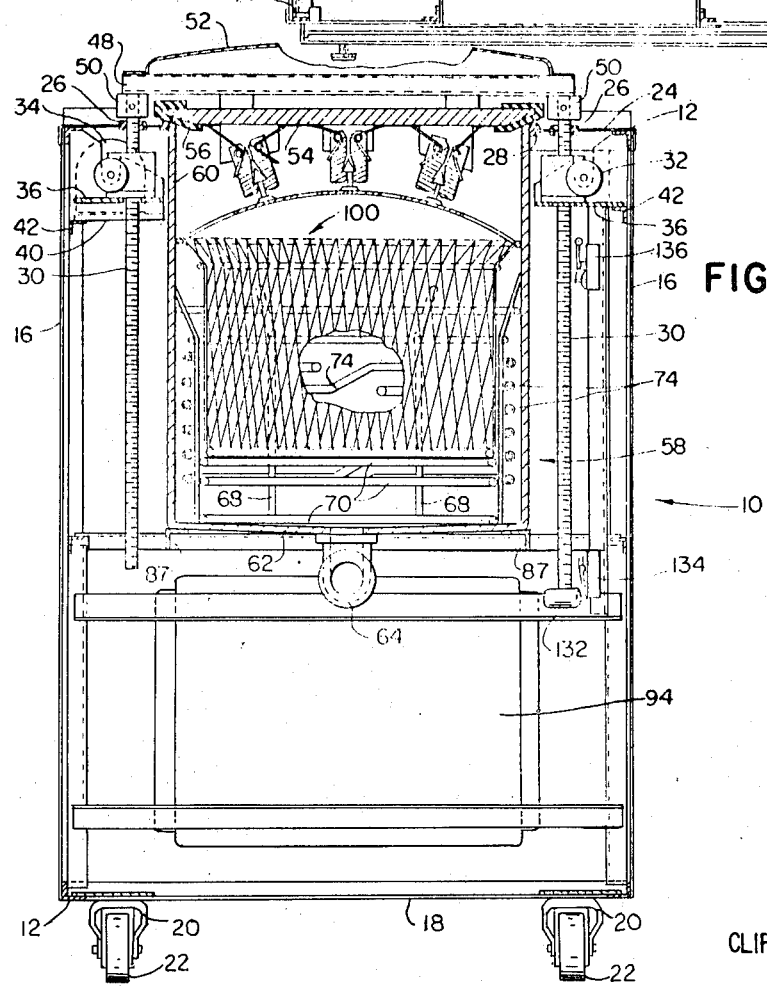
FIG. 2 is a front elevational view of the apparatus of FIG. 1 partially in cross section and with parts broken away.
Figure 4:
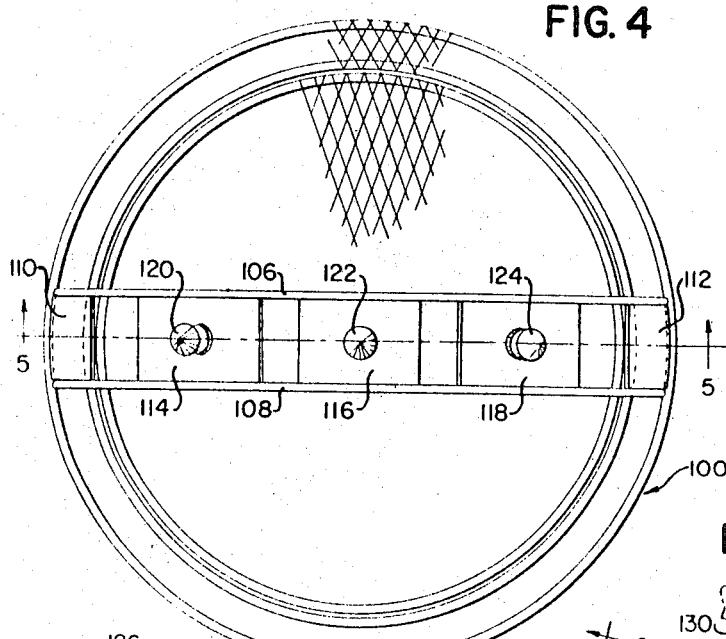
FIG. 4 is a top plan view of the basket assembly.

Referring now to FIGS. 1, 2 and 3 of the drawings, there is illustrated a frame, indicated generally at 10, having a series of horizontally extending angle members 12 and a series of vertically extending angle members 14. Side panels are indicated at 16 and a bottom panel is shown at 18, all of which are suitably affixed to the angle members 12 and 14 which form a skeleton for the frame 10. The apparatus is made portable by use of casters 20 and caster wheels 22.

A top closure is provided by means of top panel 24 which employs grommets at 26 and 28 for certain protruding elements through the top panel 24 which will be described hereinafter.

One set of protrusions through the top panel consists of a pair of screws 30 each of which is driven by a respective jack motor 32. A main drive motor 34, shown best in FIG. 3, drives one of jack motors 32 which motion is simultaneously imparted to the other jack motor 32 by means of flexible coupling 35. The jack motors 32 are suitably mounted to the frame 10 with the aid of shelf supports 36 and the main drive motor 34 is mounted on shelf 40 with suitable angle irons 42 providing the required stability for affixation to the frame 10. The main drive motor is shown to have an output shaft 44 connected by rigid coupling 46 to one of the jack motors 32 in FIG. 3.

A jack frame 48 is provided with a pair of drilled bars 50, FIG. 2, which are mounted atop the ends of screws 30 and provide the inner connection between screws 30 and a spun cover 52 which is suitably attached to the jack frame 48 such as by welding.

Jack frame 48 is attached with the aid of flange means 53 welded thereto to a circular plate member 54. The circumferential periphery of plate member 54 is provided with a gasket 56 having a suitable hardness such as a durometer of 70 to provide a hermetic seal to an internal container indicated generally at 58 by engagement of gasket 56 with the side walls 60 of container 58.

It will be observed that container 58 which is in effect a kettle into which is placed the desired amount of cooking oil, is provided with a sloping bottom 62 which leads into a pipe and drain assembly 64. The latter is of a sufficiently large enough diameter to permit both the oil and loose breading to be carried to a suitable filter (not shown) from which the oil is recycled.

An open cage member, indicated generally at 66, has a plurality of vertically extending bars 68, the upper ends of which slope outwardly and upwardly so as to provide guiding means for a wire basket 100 to be described more fully hereinafter.

The cage assembly 66 is further provided with a number of internal reinforcing members 70 and a number of external reinforcing members 72. Surrounding cage assembly 66 are a series of heating elements 74 which are received in a support member 76, FIG. 1, and are mounted in heat insulating relationship at 78 with respect to container 58.

In order to prevent any substantial buildup of pressure within the container 58, the internal atmosphere within the container 58 is vented through a threaded adapted 80 which leads to a connector 81 thence to pipe 82 to a ball check valve 84. The ball in the ball check valve 84 is made from a chrome alloy steel and is approximately 1 inch in diameter. The pipe 82 has an internal diameter of about three-fourths inch and a mouth of about 1¼ inch I.D. to receive ball check valve 84. The weight of the ball is carefully controlled, depending upon the particular elevation at which the commercial apparatus will be installed, so as to provide a controllable pressure at which the pressure within the container 58 will be vented. Thus as a representative example, the ball in the ball check valve 84 weighs 0.148 lbs. for an installation at sea level to give a vent pressure of about one-third pound per square inch. In all instances, the pressure is vented within one psi of atmospheric pressure. The ball check valve 84 prevents any undue moisture loss from within container 58 and in that connection a moisture trap or expansion chamber is provided at 85.

A pair of front to rear extending angle irons 86 and a pair of transverse angle irons 87, FIG. 3, provide a support for the internal container 58. A series of brackets 83 provide further rigid support between container 58 and the pair of transverse angle irons 87.

A thermostat 88 is positioned on the front panel of the apparatus and connects with a temperature probe 89 which is led into the interior of container 58 in order to sense the temperature during the cooking operation. For the convenience of the operator, a shelf 90 may be pulled from the front of the apparatus and with the aid of a brace 92, positioned as shown in phantom in FIG. 1 Basket 100 is placed on shelf 90 when it is set up in the phantom position of FIG. 1 and the chicken parts are placed in the wire basket 100. Any suitable form of shelf may be used.

The electrical circuitry for a preselected heating cycle and time control is contained within cabinet 94 and forms no part of the present invention.

Turning now to FIGS. 4, 5, 6 and 7 there are illustrated the details of the wire basket 100 which holds the chicken parts to be fried. Wire basket 100 is shown to have a wall portion 102 which slopes outwardly and upwardly at its upper wall as best seen at 104 in FIG. 5. A pair of bar members 106 and 108 are affixed to the edge of the sloping top wall 104 and extend diametrically across the top of basket 100. A series of end plate members 110 and 112 provide a rigid support for the ends of bar members 106 and 108. Intermediate plate members 114, 116 and 118 are fixedly secured between bar members 106 and 108 and each of them carries respectively locking members 120, 122 and 124. Each of the latter locking members 120, 122 and 124 is engageable with pairs of latching members, an individual one of which is shown at 126 in FIG. 7.

Figure 6:
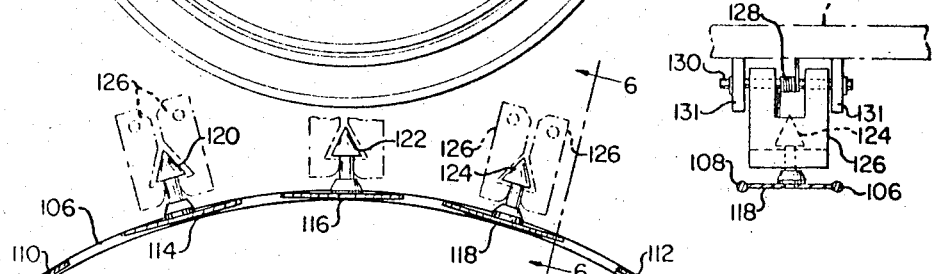
FIG. 6 is a fragmentary side elevational view of the latch assembly taken along line 6—6 of FIG. 5.
Figure 5:
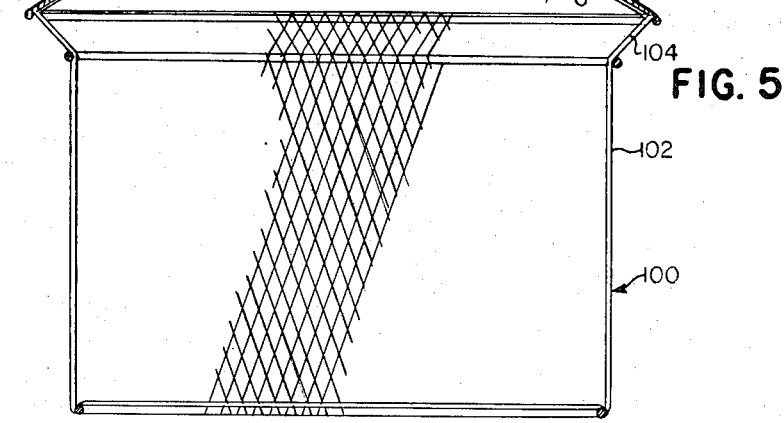
FIG. 5 is a cross sectional elevational view of the basket assembly taken along line 5—5 of FIG. 4.

Reference to FIG. 6 illustrates the general arrangement of the latching and locking members in their engaged position. Thus a torsion spring 128 normally engages the individual latching members 126 toward each other by virtue of engagement of the torsional spring with the surface 146 on latching members 126. Surface 146 provides a camming surface for the torsional springs 128. A pin 130 extends through a pair of drilled bar members 131 which are fixedly attached to the underside of plate member 54 and the pin also extends through an aperture 144 in latching members 146 and the torsional spring 128. Therefore relative vertical movement of the basket 100 results in locking members 120, 122 and 124 spreading the pairs of latching members 126 apart until the conical surface on the end of locking members 120, 122 and 124 pass a latching detent 148 on the latching members 126 at which point the torsional spring causes the latching members 126 to spring inwardly into locking relationship with locking members 120, 122 and 124. In the practice of this invention, the plate member 54 with suspended latching means 126 are driven downwardly by screw means 30 into locking engagement with locking members 120, 122 and 124. In order to remove the basket from its locked position, it is necessary only to move the basket horizontally so that the locking members 120, 122 and 124 are moved off the latching detent surface 148 whereby the basket may be removed and placed on the shelf 90 at the front of the apparatus for further disposition of the product.

Reference to FIGS. 8 and 9 shows the details of the apparatus for stopping turning of the screws 30 which are driven by jack motors 32. Thus in FIGS. 8 and 9 there is shown an actuator means 132 which is driven by the screw 30 upwardly and downwardly into contact with roller arm followers 135 of limit switch 134 in which position the gasket 56 on plate member 54 is in the position shown in FIG. 2 in hermetically sealing engagement with the wall 60 of container 58. After the cooking cycle is completed, the jack motor 32 drives the screw 30 so as to bring actuator means 132 into engagement with the roller arm follower 137 of limit switch 136 as shown in FIG. 9 in which position the basket 100 and plate member 54 are in the position illustrated in FIG. 1. The slots 138 and 140 in vertical support member 142 permit the limit switches 134, 136 to be finely adjusted to secure a desired upper and lower position for plate member 54 and associated suspended wire basket 100.

In FIG. 10, another form of the present invention is shown wherein a modified pressure relieving cap is used, indicated generally at 150. Pressure relieving cap 150 is substituted for the ball check valve 84 of FIG. 1. Cap 150 is provided with a flange 152 which is attached by bolts 154 to a mating flange 156 provided on pipe 82. Pressure relieving cap 150 has a plurality of apertures 158 whereby the kettle of the cooking apparatus is vented continuously to atmospheric pressure. The top of cap 150 serves as a baffle to prevent the escape of the cooking oils. Other baffle means may be used in addition to or in place of that provided by the top of cap 150.

In operation, the container 58 is filled with a desired amount of oil. It has been found that 2½ pounds minimum to 3 pounds of oil is required per pound of raw chicken product. The chickens themselves are a minimum of 2¼ pound shell U.S.D.A. or the equivalent fresh (not frozen) 3or 2½ pounds U.S.D.A. or equivalent fresh (not frozen) with giblets. A typical batch of chicken parts consists of 15 pounds of product. The apparatus is preheated to 370° F., the product is first marinated for a minimum of 25 minutes in a salt, sugar, (if desired) water solution. If the marination is to be quick, i.e., for 25 minutes, a solution containing 12 ounces dry measure of salt and 2 ounces of sugar to each gallon of water is used. If the marination is to be long, such as 4 hours or longer such as overnight, the solution consists of 4 ounces dry measure of salt and 1 ounce of sugar (optional) to each gallon of water. After marinating the chicken parts, they are breaded in an herb seasoned flour and must be cooked immediately, that is, within 30 minutes and not refrigerated after breading. The product is brought to room temperature within the 30 minutes and is then placed in a basket such as on shelf 90. Basket 100 is then manually dropped into container 58 with the bottom of basket 100 resting on the uppermost internal reinforcing member 70 of cage 66 as is shown in FIG. 2. At this time it is important that the product be stirred so as to prevent the chicken parts from sticking together thereby resulting in white spots on the finished chicken product by failing to fry the breading in the stuck together area.

After stirring, an "on" button (not shown) on the front panel is pushed to actuate main drive motor 34 which drives jack motors 32 thereby turning screws 30.

The screws 30 will turn in synchronism to lower plate member 54 and suspended latching members 126 until such time as actuator means 132 engages the roller cam follower 135 of limit switch 134 at which time rotation ceases. When this occurs, the gasket 56 on plate member 54 is in hermetic sealing relationship with the wall 60 of container 58 and locking members 120, 122 and 124 are in locking engagement with their associated spring loaded latching members 126 as is illustrated in FIG. 2. In order to accomplish this, the locking members 120, 122 and 124 had to push the spring loaded latching members 126 outwardly in pivoting relationship until such time as the conical heads on the locking members 120, 122 and 124 have passed and engage the latching detent 148 of the latching members 126.

The oil has been preheated to between 350° F. and 375° F., such as 370° F., at which temperature the chicken parts are cooked for about one minute to seal in the moisture. The temperature of the oil in container 58 is programmed to be cut back to between 275° F. and 315° F., such as 290° F., and continued for about 11 more minutes. During this time the pressure within container 58 is prevented from increasing because of the ball check valve 84 which relieves the pressure so that it never rises to more than 1 psi gauge above atmospheric. After cooking for about 11 minutes at a temperature between 275° F. and 315° F., such as 290° F., a timing device overrides limit switch 134 so as to restart the motor drive whereupon screw 30 turns so as to drive the actuator means 132 vertically upward until such time as it engages the roller arm follower 137 of limit switch 136, at which time the motor cuts off.

If it is impossible to fry the chicken within one-half hour of the marinating step, it is important that the chicken be re-marinated. This is accomplished by marinating the chicken in the same marinating solution for from 1 to 5 minutes, and preferably 1 minute.

It is important that the oil used in cooking must be filtered a minimum of each ten runs, and it is also important to prevent any water from getting into the oil. It will also be observed that the heating elements 74 are spaced from the bottom of the container 58. This establishes a cold area adjacent the bottom of container 58 so that the breading may fall from the chicken parts and settle to the bottom of container 58 without burning. Therefore, a burned flavor is not imparted to the chicken parts.

The breading solution is prepared by adding and beating one dozen fresh eggs, either medium of Grade A large, to each gallon of whole Grade A milk (not powdered). After draining, the product is rolled in herb seasoned flour and must be cooked substantially immediately without refrigeration after the product is brought to room temperature.

It is thought that the invention and many of its attendant advantages will be understood from the foregoing description, and it will be apparent that various changes may be made in the form, construction and arrangement of parts and the apparatus taught herein without departing from the spirit and scope of the invention, the form hereinbefore described being merely a preferred embodiment thereof.

What is claimed is:
1. Apparatus for frying chicken comprising
   a. a frame member,
   b. a container for cooking oil held within said frame member,
   c. receptacle means for holding a batch of chicken parts,
   d. means for heating said chicken parts when said receptacle means is immersed in said cooking oil,
   e. screw means for raising said receptacle means so as to withdraw the chicken parts from the cooking oil in said container,
   f. means for sealing said container,
   g. and pressure relief means communicating with said container consisting of means for venting said container continuously to atmospheric pressure, h. said pressure relief means also constituting baffle means to prevent undue loss of moisture from said container.

2. Apparatus for frying chicken comprising
   a. a frame member,
   b. a container for cooking oil held within said frame member,
   c. receptacle means for holding a batch of chicken parts,
   d. means for heating said chicken parts when said receptacle means is immersed in said cooking oil,
   e. screw means for raising said receptacle means so as to withdraw the chicken parts from the cooking oil in said container,
   f. means for sealing said container,
   g. and pressure relief means communicating with said container to ensure that the gauge pressure within said container does not exceed a predetermined level,
   h. said means for sealing said container including plate member means having peripherally retained gasket means engageable with a wall of said container,
   i. the underside of said plate member means being provided with spring loaded latch means and said receptacle means consisting of a wire basket having locking means carried thereby whereby relative vertical movement between said spring loaded latch means and said locking means effects a locking operation and relative horizontal movement between said spring loaded latching means and said locking effects an unlocking operation.

3. Apparatus for frying chicken as defined in claim 2, including motor means for driving said screw means to effect automatically the required relative movement between said spring loaded latch means and said locking means, and limit switch means for limiting the turning of said screw means.

4. Apparatus for frying chicken as defined in claim 3 wherein said means for sealing said container includes a plate member having peripherally retained gasket means engageable with a wall of said container.

5. Apparatus for frying chicken as defined in claim 4 including a plurality of screw means and a plurality of motor drive means connected thereto.

6. Apparatus for frying chicken as defined in claim 5 wherein said plurality of screw means are driven in synchronism and wherein said motor drive means includes a flexible coupling interconnecting one screw means with another screw means.

7. Apparatus for frying chicken comprising
   a. a frame member,
   b. a container for cooking oil held within said frame member,
   c. receptacle means consisting of a wire basket for holding a batch of chicken parts,
   d. means for heating said chicken parts when said receptacle means is immersed in said cooking oil,
   e. screw means for raising said receptacle means so as to withdraw the chicken parts from the cooking oil in said container,
   f. means for sealing said container,
   g. pressure relief means communicating with said container to ensure that the gauge pressure within said container does not exceed a predetermined level,
   h. an open cage member between said basket and said container,
   i. locking means carried by said basket,
   j. mating locking means carried on the underside of said means for sealing said container,
   k. said cage member serving to position said wire basket within said container whereby said locking means carried by said basket may be automatically locked to said mating locking means carried on the underside of said means for sealing said container for automatic withdrawal from said container.

8. Apparatus for frying chicken comprising
   a. a frame member,
   b. a container for cooking oil held within said frame member,
   c. receptacle means for holding a batch of chicken parts,
   d. means for heating said chicken parts when said receptacle means is immersed in said cooking oil,
   e. screw means for raising said receptacle means so as to withdraw the chicken parts from the cooking oil in said container,
      1. said receptacle means permitting drainage of oil from said chicken parts when said receptacle means is raised from said container,
   f. means for sealing said container,
   g. pressure relief means communicating with said container to ensure that the gauge pressure within said container does not exceed a predetermined level,
   h. locking means carried by said receptacle means,
   i. and mating locking means carried on the underside of said means for sealing said container whereby said locking means carried by said receptacle means may be automatically locked to said mating locking means carried on the underside of said means for sealing said container for automatic withdrawal of said receptacle means from said container.

* * * * *